(12) United States Patent
Kawano et al.

(10) Patent No.: US 6,240,203 B1
(45) Date of Patent: May 29, 2001

(54) IMAGE DISCRIMINATING APPARATUS

(75) Inventors: Hiroshi Kawano, Yamatokoriyama; Haruo Yamamoto, Osaka, both of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/188,577

(22) Filed: Nov. 9, 1998

(30) Foreign Application Priority Data

Nov. 10, 1997 (JP) .................................................. 9-306848
Dec. 26, 1997 (JP) .................................................. 9-360655

(51) Int. Cl.$^7$ .................................................. G06K 9/00
(52) U.S. Cl. .......................................................... 382/164
(58) Field of Search .................................. 382/162–164, 382/165–194; 358/500–501

(56) References Cited

U.S. PATENT DOCUMENTS

| | | | | |
|---|---|---|---|---|
| 5,072,291 | * | 12/1991 | Sekizawa | 358/535 |
| 5,282,026 | * | 1/1994 | Nagata | 358/500 |
| 5,592,310 | * | 1/1997 | Sugiura | 358/501 |
| 5,903,360 | * | 5/1999 | Honma et al. | 358/450 |

FOREIGN PATENT DOCUMENTS 3-270380    12/1991   (JP) .
4-282968    10/1992   (JP) .

* cited by examiner

*Primary Examiner*—Joseph Mancuso
*Assistant Examiner*—Ali Bayat
(74) *Attorney, Agent, or Firm*—David G. Conlin; Steven M. Jensen; Dike, Bronstein, Roberts & Cushman

(57) ABSTRACT

There is provided an image discriminating apparatus for discriminating the type of an image accurately. The apparatus compares a maximum value R among absolute values of mutual differential values of three color components of each pixel composing an image, with two predefined threshold values $\beta$ and $\gamma$, respectively, and counts numbers C1–C3 of the monochrome pixels, medium pixels and color pixels, respectively, on the basis of the comparison result for each line within the image. The apparatus judges each line within the image as a color line when $C3+C2\times\omega > \theta$, as a monochrome line when $C1 > v$, and judges the image as a color image when a number of color lines in the whole image exceeds a threshold value. The second apparatus compares maximum and minimum values of the absolute values of each pixel with three threshold values to judge whether each pixel is a color, medium, ground or monochrome pixel and increments counter values of color, medium and monochrome pixel counters according to the range of each discriminated pixel. When the number of continuous monochrome pixels exceeds a threshold value within the image, the apparatus corrects the three counters and discriminates the type of the image based on the three counters after the correction.

9 Claims, 15 Drawing Sheets

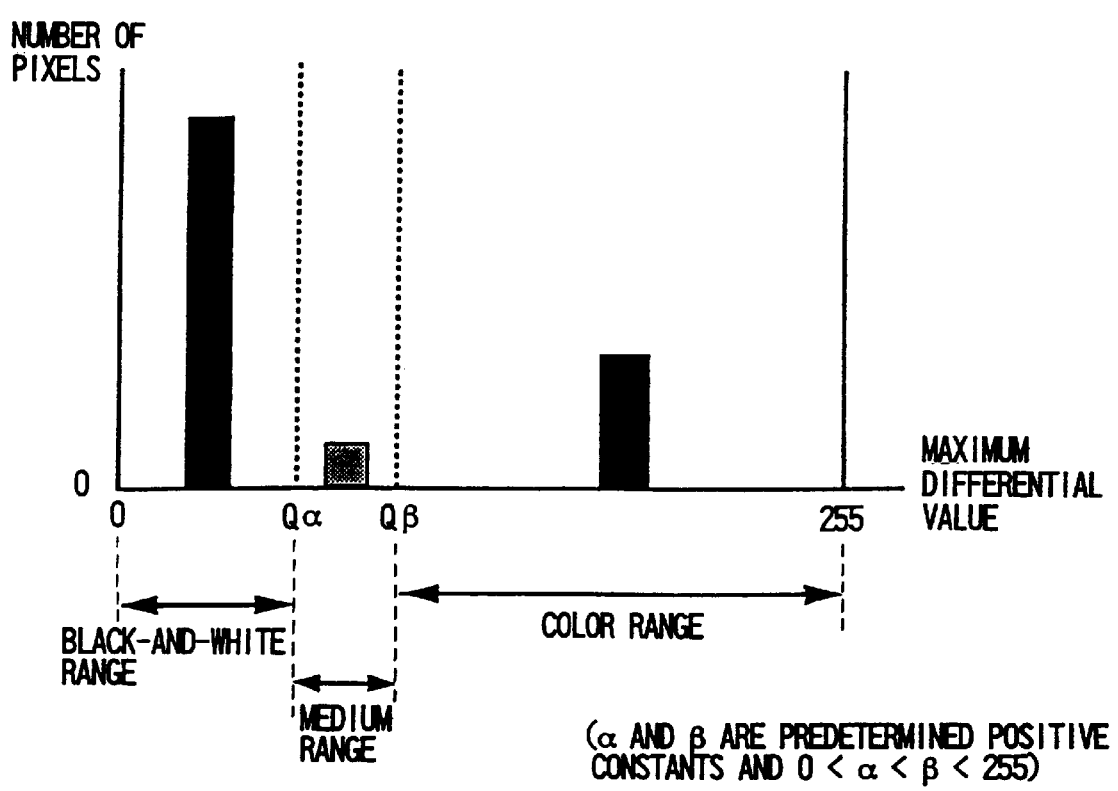

IMAGE DISCRIMINATING APPARATUS

BACKGROUND OF THE INVENTION

1. Field of the Invention

The present invention relates to an image discriminating apparatus for discriminating the type of an image to be processed in an image processor within an image creating apparatus such as digital color copiers and printers capable of printing in multi-colors. Specifically, the invention relates to an image discriminating apparatus for discriminating ranges in an image in which color areas and monochrome areas might be mixed.

2. Description of the Related Art

Hitherto, image data used for copying or printing images in offices and others has been that of a black-and-white image called a monochrome image in many times and it may be not too much to say that they are mostly monochrome data. However, since color image creating apparatuses such as a high image quality color copier and a color printer are spreading and the needs for printing in color are increasing also in offices lately, images handled in the offices are to be also colored more and more. Accordingly, color images and monochrome images are mixed among images to be processed by the color image creating apparatus.

In such color image creating apparatus, there is a case when black characters and fine lines do not form halftone dots and are blurred due to misregistration of colors and to the spectral and distributive characteristics of inks when a black-and-white image is copied by superimposing a plurality of colors of color recording substances. Further, considering the process in processing a color image, there have been problems that it takes time to process the image as if it is composed of a plurality of color-separated components even though it is a black-and-white image and that it is costly to form the image through a plurality of processes, beside the problem that the copying quality or the printing quality drops as described above. The plurality of components described above are the three primary colors of red (R), green (G) and blue (B) or of yellow (Y), magenta (M) and cyan (C) for example.

Dedicated image processing and image creation are carried out on a color original and a monochrome original, respectively, in order to create color and monochrome images in high quality and efficiently. For instance, as for the color original, an image thereof is created by using toners or inks of a plurality of colors such as Y (yellow), M (magenta), C (cyan) and BK (black) after implementing color data image processing on each pixel data. As for the monochrome original, an image thereof is created by using monochrome or single-color toner or ink after implementing monochrome data image processing on each pixel data. Thereby, the reproducibility of the color original may be improved and it is possible to prevent color toners or the like from being wasted for the monochrome original and color noise from occurring at edge portions of the image.

Accordingly, it is necessary to judge whether an image to be processed is a color image containing color information or a monochrome image composed of only monochrome information and to select an appropriate process corresponding to the type of the image in the color image creating apparatus. Therefore, it is essential to provide, the color image discrimination for judging whether the image is a color image or a monochrome image.

As the prior art technologies concerning on the color image discrimination, there have been ones disclosed in Japanese Unexamined Patent Publications JP-A 3-270380 (1991) and JP-A 4-282968 (1992) for example. JP-A 3-270380 has introduced a method of outputting a color image discriminating signal in correspondence to a number of output times of a color discriminating signal. That is, this prior art method comprises steps of judging whether each pixel is a color pixel or a monochrome pixel, counting a number of color pixels within an image, judging the image as a color image when the counted counter value indicates that the color pixels occur more than a predetermined number of times and judging the image as a monochrome image otherwise.

JP-A 4-282968 has introduced an original discriminating apparatus for discriminating a color image on the basis of a result of discrimination of each line. That is, this prior art apparatus discriminates an image through steps of judging whether each pixel is a color pixel or a monochrome pixel, recognizing detected continuous color pixels as a color block when the existence of the color pixels which continue more than a predetermined number in order of given pixels is detected, judging a line as a color line and counting it when there exist more than a predetermined number of color blocks within that one line, judging the image as a color image when there exist more than a predetermined number of color lines within the image and judging the image as a monochrome image otherwise.

However, the original discriminating apparatus of JP-A 4-282968 described above has had problems that because it performs the judgement whether or not a pixel is a color pixel, the sampling of the color block, the judgement whether or not a line is a color line and the judgment whether or not an image is a color original, respectively, by comparing with a single threshold value set in advance, it can determine whether the image is a color original or a monochrome original only alternatively in the end, it cannot deal with a situation where the final discrimination result may be erroneous like the case when erroneous discrimination occurs in the judgment whether or not a pixel is a color pixel, in the sampling of the color block and in the judgment whether or not a line is a color line, and it cannot judge whether or not the original is a color original accurately. It has had another problem that when reading precision of original reading means is low, it is liable to cause color noise at peripheral or edge portions of black characters of a monochrome original and to discriminate erroneously a monochrome pixel as a color pixel by the color noise.

Further, although the prior art technologies disclosed in JP-A 3-270380 and JP-A 4-282968 judge whether each pixel is a color pixel or a monochrome pixel and discriminate an image by a range occupied by an area composed of color pixels within the image or by a rate between an area composed of color pixels and an area composed of monochrome pixels in the image discrimination. However, in such a method, because no consideration is given to erroneous discrimination of pixels, there has been a possibility that the result of the image discrimination is also erroneously outputted when the erroneous discrimination occurs in the pixel discrimination.

As the erroneous discrimination of pixels, there are cases of erroneously judging a color pixel as a monochrome pixel and vice versa, erroneously judging a monochrome pixel as a color pixel. Such erroneous discrimination results from the effect of the color noise which occurs mainly at the monochrome edge portions and from mishandling of a pixel which cannot be judged whether it is a color pixel or a monochrome pixel just by a value of density of one pixel and which is often questioned at the ground part of the original and in an area of so-called a pastel. The color noise which occurs at the monochrome edge portion is color misregistration which results from deviation in reading an image and a degree of reading. When it occurs, there is a possibility that a pixel which should be actually belonging to a monochrome range is recognized as a color pixel belonging to a color range.

SUMMARY OF THE INVENTION

Accordingly, it is an object of the present invention to provide an image discriminating apparatus which is capable of judging whether an image is a color image containing color information or a monochrome image composed of only monochrome information accurately on real-time without increasing the size of a circuit structure thereof considerably.

The invention provides an image discriminating apparatus comprising image inputting means for inputting image data corresponding to an image composed of a plurality of lines each composed of a plurality of pixels, which image data contains a plurality of color components of each pixel; a pixel categorizing section for categorizing each pixel into a color pixel, an medium pixel or a monochrome pixel; a line categorizing section for categorizing each line into a color line or a monochrome line based on numbers of the color pixels, medium pixels and monochrome pixels in each line; and an image categorizing section for categorizing the image into a color image or a monochrome image based on a number of color lines in the image.

According to the invention, in the image discriminating apparatus, each pixel is determined to be a color pixel, a medium pixel or a monochrome pixel based on the plurality of color components for inputted pixel. That is, each pixel of the image is categorized not only into the color pixel or the monochrome pixel but also into the medium pixel which is not clear whether it is a color pixel or a monochrome pixel, i.e., into any of the three types, and the type of each line is discriminated based on the categorization result of each pixel. Accordingly, the image is determined whether it is a color image or a monochrome image taking also the pixels which are not clear whether they are color pixels or monochrome pixels into consideration. As a result, the image discriminating apparatus can perform the determination more accurately.

In the invention it is preferable that when a value obtained by adding a value obtained by multiplying the number of the medium pixels in one line with a predefined value of weight to the number of color pixels exceeds a predefined threshold value, the line categorizing section judges the line as being a color line.

According to the invention, the value obtained by adding the value obtained by multiplying the number of medium pixels in each line with the value of weight to the number of color pixels is compared with the threshold value in judging whether or not each line is a color line in the image discriminating apparatus. Accordingly, each line is judged whether or not it is a color line taking also the existence of the pixels which are not clear whether they are color pixels or monochrome pixels into consideration. As a result, the image discriminating apparatus can discriminate the type of each line more accurately.

In the invention it is preferable that when the line categorizing section detects a monochrome block which is composed of a plurality of continuous monochrome pixels within one line, the line categorizing section subtracts number of pixels adjacent to the both sides of the monochrome block from at least either the number of the color pixels or the number of the medium pixels.

According to the invention, the pixels adjacent to both sides of the monochrome block in each line are not used in the judgment whether the line is a color line or a monochrome line in the image discriminating apparatus. Accordingly, color noise which occurs at the peripheral or edge portion of a character will give no influence in the judgment whether the image is a color image or a monochrome image. As a result, the image discriminating apparatus can discriminate the type of the image more accurately without influence of color noise.

The invention provides an image discriminating apparatus comprising image inputting means for inputting image data corresponding to an image composed of a plurality of pixels, which image data -contains a plurality of color components of each pixel; pixel range discriminating means for judging to which of a color range, a medium range or a black-and-white range each pixel belongs based on the image data obtained from the image inputting means; black-and-white range discriminating means for categorizing a pixel judged to belong to the black-and-white range by the pixel range discriminating means, into a monochrome range or a ground range; pixel counting means for counting numbers of appearance of color pixel, medium pixel and monochrome pixel, the pixel counting means incrementing a color pixel counter, a medium pixel counter or a monochrome pixel counter each time a pixel which is judged as belonging to the color range, the medium range or the monochrome range by the pixel range discriminating means and the black-and-white range discriminating means appears; monochrome block recognizing means for when there exists a portion where more than a predetermined number of pixels which are judged as belonging to the monochrome range by the black-and-white range discriminating means occur continuously, recognizing the portion as a monochrome block; counter value correcting means for, when pixels positioned at both ends of the monochrome block recognized by the monochrome block recognizing means belong to the color range or the medium range, decrementing the color pixel counter or the medium pixel counter by numbers of pixels of the color range and of the medium range at both ends of the monochrome block, and when the pixels positioned at both ends of the monochrome block belong to the ground range, not incrementing nor decrementing any of the color pixel counter, the medium pixel counter and the monochrome pixel counter; and image categorizing means for categorizing the image into a color image or a monochrome image based on the counter values of the color pixel counter, medium pixel counter and monochrome pixel counter.

According to the invention, on the basis of the image data in which the color of each pixel is separated into a plurality of color components, the pixel range discriminating means in the image discriminating apparatus discriminates for each pixel, to which range the pixel belongs, the color range, the black-and-white range or the medium range which does not quite fit the color range nor the black-and-white range. Additionally the pixel which is judged as belonging to the black-and-white range is separated into the ground range and the monochrome range by the black-and-white range discriminating means. When the pixels positioned at both ends of the monochrome block belong to the color range or the medium range, the counter value correcting means decrements the color pixel counter and medium pixel counter in which the numbers of color range pixels and medium range pixels are counted by the pixel counting means, by the respective numbers of the color range pixels and medium range pixels positioned at both ends of the monochrome block. However, when the pixels positioned at the both ends of the monochrome block belong to the ground range, the count correcting means does not increment nor decrement any of the color pixel counter, medium pixel counter and monochrome pixel counter. The image categorizing means can judge whether the image indicated by the image data is a color image or a monochrome image on the basis of the counter values of the color pixel counter, medium pixel counter and monochrome pixel counter.

As described above, according to the invention, the image discriminating apparatus can cause the numbers of pixels existing respectively in the color range, medium range and monochrome range within the image to correspond to the counter values of the color pixel counter, the medium pixel counter and the monochrome pixel counter, respectively. As a result, image discrimination can be carried out without buffers for storing image data in discriminating the range. Thereby, the circuit structure for discriminating images may be compacted and the appropriate discrimination may be carried out quickly.

In the invention it is preferable that in judging to which of the color range, the medium range or the black-and-white range each pixel belongs, the pixel range discriminating means selects a maximum from absolute values of mutual differential values of combinations of the color components of a portion within the image data, corresponding to each pixel, and adopts the maximum absolute value as a criterion to discriminate the pixel.

According to the invention, the pixel range discriminating means in the image discriminating apparatus separates the portion within the image data, corresponding to each pixel, into a plurality of color components and selects a maximum among the absolute values of mutual differential values of the combinations of the color components as the criterion to categorize into the three ranges of the color range, the medium range or the black-and-white range. Accordingly adequate discrimination of pixel can be achieved. In the black-and-white range the color components are almost equivalent, so that the absolute values of the mutual differential values of the combinations are small. Accordingly a pixel which belongs to the black-and-white range can be readily discriminated. A pixel in the color range may be also discriminated readily because a mutual differential value whose absolute value is considerably large exists in any one of the combinations. When it is difficult to discriminate the range just by the mutual differential values, the range is categorized into the medium range, so that each pixel may be categorized readily into the color, medium or black-and-white ranges. As described above, according to the invention, the pixel range discriminating means selects the maximum absolute value of the mutual differential values of the combinations of color components of each pixel, so that each pixel can be categorized into the color, medium or black-and-white ranges by comparing the maximum absolute value with a predetermined threshold value.

In the invention it is characterized in that the black-and-white range discriminating means compares a minimum of color component values of a portion within the image data, corresponding to each pixel judged as belonging to the black-and-white range, with the predetermined threshold value in connection with the categorization into the monochrome range and the ground range, and on the basis of a result of the comparison, categorizes each pixel into the monochrome range or the ground range.

According to the invention, the black-and-white range discriminating means within the image discriminating apparatus compares the minimum of the color component values of a portion within the inputted image data, corresponding to each pixel, with the predetermined threshold value. When the pixel belongs to the monochrome range, each color component value should be greater than the predetermined threshold value and even the minimum of the color component values exceeds the predetermined threshold value. When the pixel belongs to the ground range, each color component value becomes small and the minimum value becomes smaller than the predetermined threshold value, so that it can be readily judged whether each pixel belongs to the monochrome range or the ground range. As described above, according to the invention, the image discriminating apparatus categorizes the pixel judged as belonging to the black-and-white range further into the white range which is also considered to be the ground of the image and the monochrome range which is the main range where color noise actually occurs and sets only the monochrome range as an object from which color noise is to be removed. Thereby, the reliability of the color noise removing process in the image discriminating apparatus may be improved.

BRIEF DESCRIPTION OF THE DRAWINGS

Other and further objects, features, and advantages of the invention will be more explicit from the following detailed description taken with reference to the drawings wherein:

FIG. 7 is a graph showing a concept in categorizing a pixel into a color range, an medium range or a black-and-white range in the second embodiment;

DETAILED DESCRIPTION OF THE PREFERRED EMBODIMENTS

Figure 1:
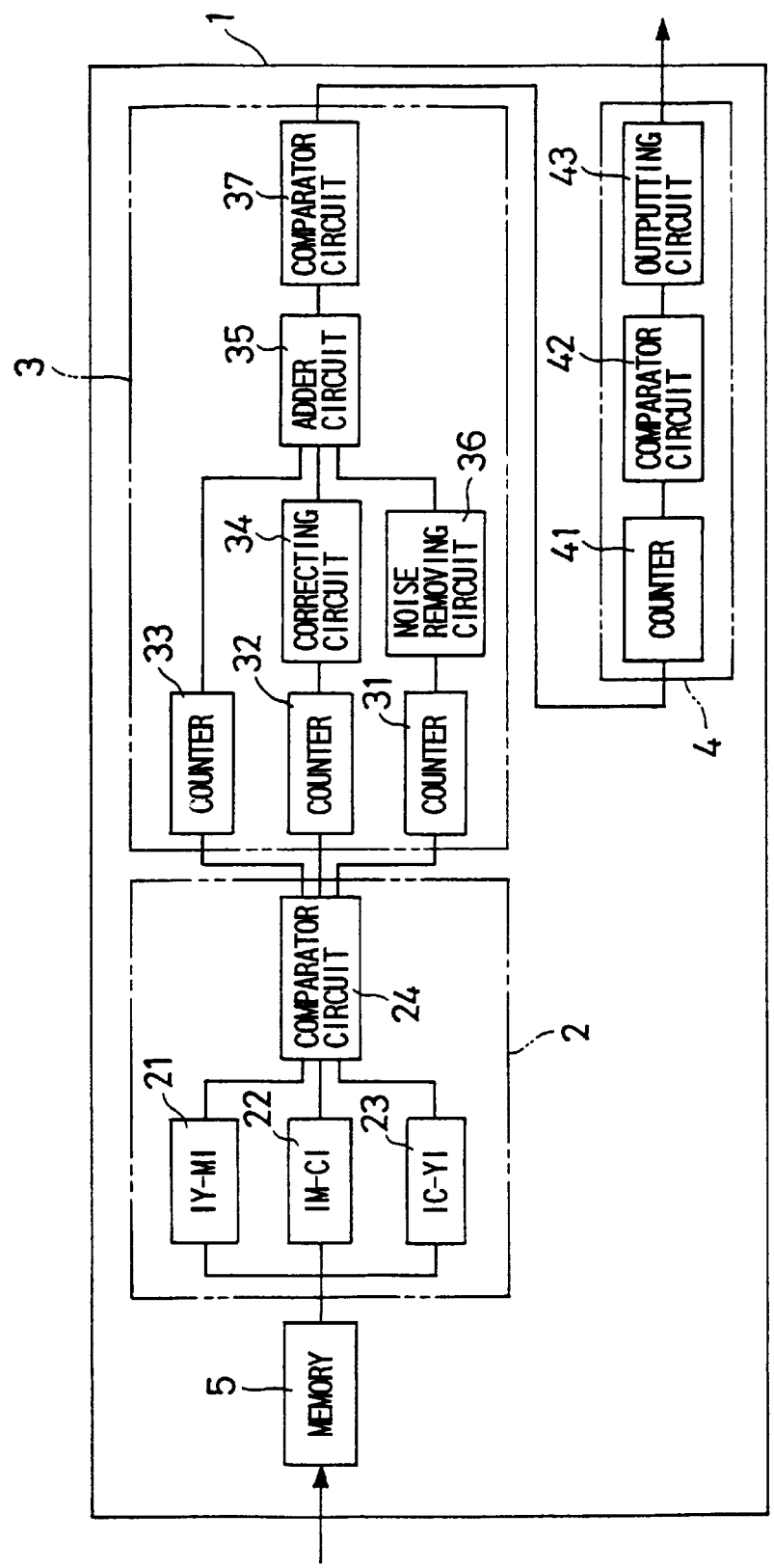
FIG. 1 is a block diagram showing a schematic electrical structure of an image discriminating apparatus according to a first embodiment of the present invention.

Now referring to the drawings, preferred embodiments of the invention are described below.

FIG. 1 is a block diagram showing the structure of an image discriminating apparatus according to a first embodiment of the present invention. The image discriminating apparatus 1 comprises a pixel categorizing section 2, a line categorizing section 3, an original categorizing section 4 and a memory 5. The pixel categorizing section 2 comprises differential computing circuits 21 through 23 and a comparator circuit 24. The line categorizing section 3 comprises pixel counters 31 through 33, a correcting circuit 34, an adder circuit 35, a noise removing circuit 36 and a comparator circuit 37. The original categorizing section 4 comprises a line counter 41, a comparator circuit 42 and an output circuit 43.

Figure 2:
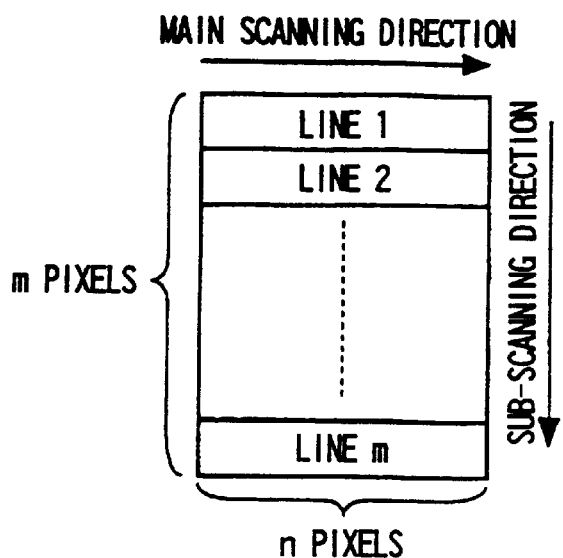
FIG. 2 is a chart showing a number of pixels in an image whose type is to be discriminated by the image discriminating apparatus of the first embodiment.

Image data of an image composed of n pixels×m pixels in the main scanning direction and in the sub-scanning direction, respectively, is inputted to the image discriminating apparatus 1 for each line in the main scanning direction as shown in FIG. 2. The image data of one line contains YMC data of the respective n pixels composing the line and is stored in the memory 5. This YMC data is composed of Y data, M data and C data representing density of each color when read data corresponding to colors for each pixel of the image is separated into the three subtractive primary colors, i.e., yellow, magenta and cyan.

The image data of the image may be obtained by scanning the surface of an object to be read, e.g., an original, by color image pickup means including image pickup devices and color filters of the three primary colors, i.e., by scanning by using the image pickup devices via the color filters. It is noted that because the image data of the image is stored in the memory 5 for each line, the memory 5 having a storage capacity for storing at least one line of the image data will do and the structure of the image discriminating apparatus 1 may be miniaturized.

Figure 3:
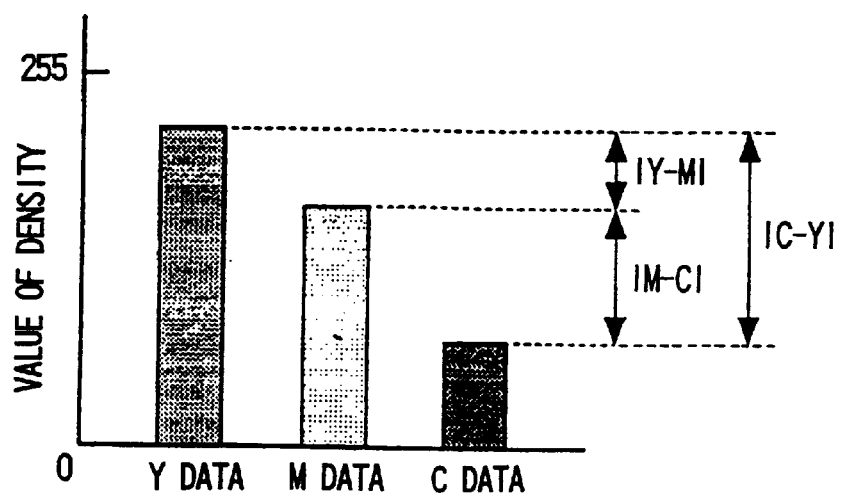
FIG. 3 is a graph showing computed values of a differential computing circuit contained in the image discriminating apparatus of the first embodiment.

The YMC data of one line stored in the memory 5 is inputted to the pixel categorizing section 2 for each pixel. In the pixel categorizing section 2, the differential computing circuits 21 through 23 calculate absolute values |Y−M|, |M−C| and |C−Y| of the differences of the three data composing the YMC data of one pixel, respectively, as shown in FIG. 3. The results computed by the differential computing circuits 21 through 23 are then inputted to the comparator circuit 24. The comparator circuit 24 compares the results of computation of the differential computing circuits 21 through 23 each other, compares the results of computation of the differential computing circuits 21 through 23 with predefined threshold values, and based on the results of those comparisons, categorizes the pixels of the inputted YMC data into three types to output signals corresponding to the types.

Figure 4:
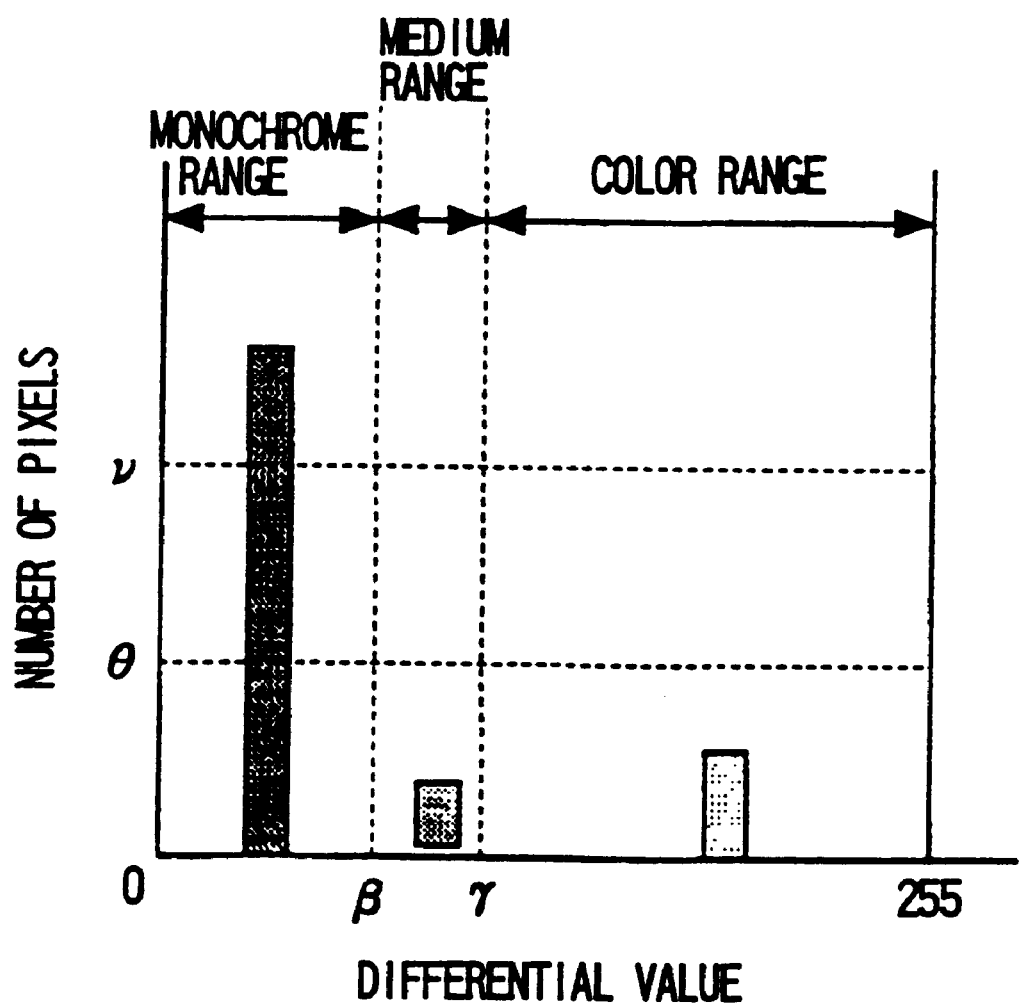
FIG. 4 is a graph for explaining contents of processing in a comparator circuit of a color line discriminating section contained in the image discriminating apparatus of the first embodiment.

That is, as shown in FIG. 4, the comparator circuit 24 compares a maximum differential value R which is the maximum value among the differential values |Y−M|, M−CL and |C−Y| which are the result of the computation of the differential computing circuits 21 through 23 with threshold values β and γ (0<β<γ<255) and discriminates a pixel of the inputted YMC data as a pixel in the monochrome range when 0<R<β, as a pixel in the color range when γ<R<255 and as a pixel in the medium range which cannot be distinguished either to the monochrome range or the color range when β≦R≦γ. Corresponding to this discrimination result, the comparator circuit 24 outputs a monochrome pixel signal Sb, a medium pixel signal Sm or a color pixel signal Sc. The pixel categorizing section 2 executes this range discrimination for each pixel on all pixels contained in one line. The maximum value of the threshold value γ may be a value other than 255.

It is noted that each data of Y, M and C inputted to the differential computing circuits 21 through 23 may be what has been weighted in order to adjust the color balance. Each data of the additive primaries of R, G and B may be also inputted.

The signals outputted from the comparator circuit 24 are inputted to the line categorizing section 3. Then, each of the monochrome pixel signal Sb, the medium pixel signal Sm or the color pixel signal Sc outputted in correspondence respectively to all of the pixels contained in one line is counted cumulatively by the pixel counters 31 through 33. The line categorizing section 3 inputs counter values of the pixel counters 31 through 33 to the comparator circuit 37 via the correcting circuit 34, the adder circuit 35 and the noise removing circuit 36. Based on the result of comparison between the counter values and threshold values, the comparator circuit 37 judges whether or not a line of the YMC data stored in the memory 5 is a color line and outputs a color line signal indicative of that discrimination result.

That is, the three pixel counters 31 through 33 count a number of outputs of the monochrome, medium and color pixel signals Sb, Sm and Sc outputted in correspondence to the YMC data stored in the memory 5, respectively. As a result, the counter values C1 through C3 of the three pixel counters 31 through 33 correspond respectively to a number of pixels in the monochrome, medium and color ranges contained in the line indicated by the YMC data.

That is, as shown in FIG. 4, the comparator circuit 37 compares the counter values C1 through C3 of the pixel counters 31 through 33 which are the result obtained by implementing the range discrimination on the all pixels contained in one line with threshold values θ and ν and judges as a color line when:

C3 (counter value of color pixel signal Sc)+C2 (counter value of medium pixel signal Sm)×ω>θ (where ω=−½), or judges as a monochrome line when:

C1 (counter value of monochrome pixel signal Sb)>ν. Thus, the counter value C2 of the pixels in the medium range is multiplied by the value of weight ω in the correcting circuit 34 and is then added to the counter value C3 of the pixels in the color range in the adder circuit 35. The pixels in the medium range are used for the discrimination of the color line by a half of weight of the pixel in the color range.

Figure 5A:
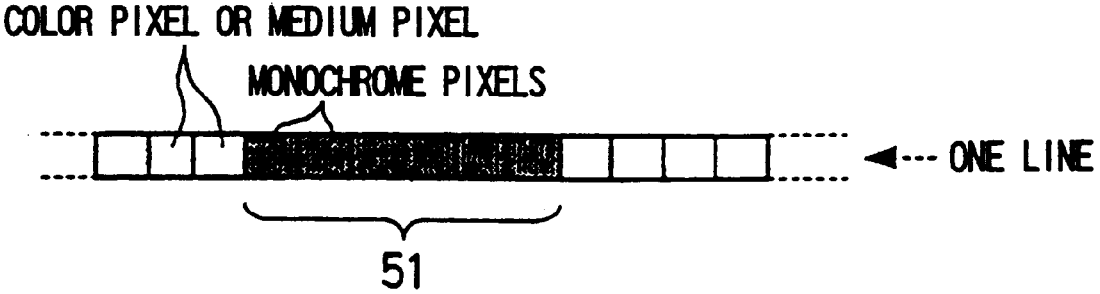
FIGS. 5A and 5B are diagrams for explaining contents of processing in a noise removing circuit in the color line discriminating section contained in the image discriminating apparatus of the first embodiment.
Figure 5B:
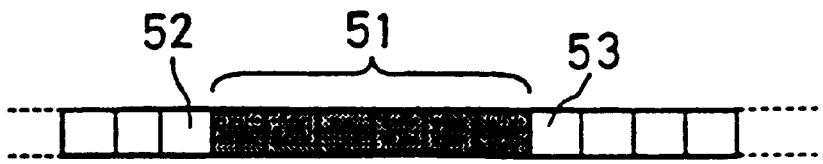

The noise removing circuit 36 counts a number of continuous inputs of the monochrome pixel signal in the pixel counter 31 and determines that a monochrome block 51 exists when the counted counter value exceeds a threshold value a as shown in FIG. 5A and eliminates a number of times of outputs of pixel signals outputted in correspondence to the YMC data of a predetermined number of pixels including pixels 52 and 53 adjacent to the both sides of the monochrome block 51, as shown in FIG. 5B, from the counter values of the pixel counters 32 and 33. That is, at least two color pixel signals or medium pixel signals outputted based on the pixel YMC data are nullified per monochrome block. Thereby, the influence of color noise occurring at the peripheral or edge portion of characters may be steadily removed.

The color line signal outputted from the comparator circuit 37 is inputted to the original categorizing section 4 and is counted by the line counter 41. A counter value of the line counter 41 is inputted to the comparator circuit 42 every time when the process of one image ends. The comparator circuit 42 compares the counter value of the line counter 41 with a threshold value and outputs a signal corresponding to the result of the comparison to the output circuit 43. Based on the signal inputted from the comparator circuit 42, the output circuit 43 outputs color data indicative of that the image is a color image or monochrome data indicative of that the image is a monochrome image to an external apparatus.

That is, when a number of color lines in one image exceeds the threshold value in the comparator circuit 42, the color data indicative of that the image is a color image is outputted from the outputting circuit 43 based on the signal outputted from the comparator circuit 42.

As described above, when the YMC data of pixels of one line is inputted, the image discriminating apparatus of the first embodiment judges to which range of the color, medium or monochrome ranges each pixel belongs, counts a number of pixels contained in each range per line, judges whether each line is a color line or a monochrome line based on the result of the count, and judges whether the image is a color image or a monochrome image based on a number of lines judged as a color line within the image. Specifically, because a pixel which is difficult to distinguish whether it is a color pixel or a monochrome pixel in the discrimination of each pixel is defined as a pixel in the medium range and the pixel in the medium range is added to the color pixel while weighting by a certain degree, the type of an image which is otherwise hard to discriminate may be discriminated more accurately.

Further, because the image discriminating apparatus of the first embodiment removes the pixels adjacent to the both sides of the monochrome block from the line type discriminating process when a predetermined number of monochrome pixels continue and the monochrome block is formed in each line, the influence of color noise occurring at the peripheral or edge portion of the characters may be steadily removed and the type of the image may be discriminated more accurately. It is noted that the number of pixels to be removed when a monochrome block is detected may be set arbitrarily under the condition that at least pixels adjacent to the both sides of the monochrome block should be included in the number.

Figure 6:
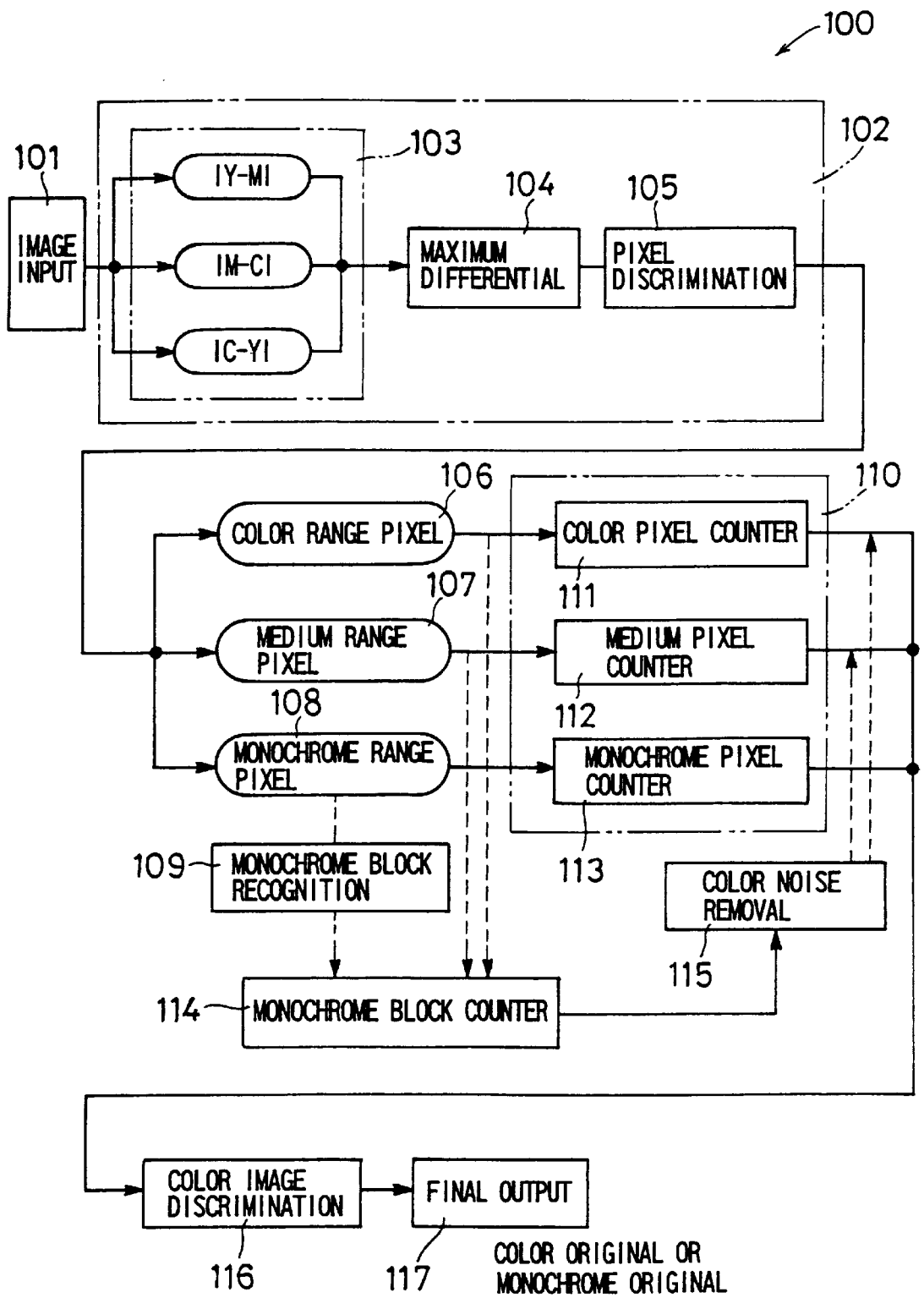
FIG. 6 is a block diagram showing a schematic electrical structure of an image discriminating apparatus according to a second embodiment of the invention.

FIG. 6 shows the schematic structure of an image discriminating apparatus 100 according to a second embodiment of the invention. In the present embodiment, it is assumed that color image data to be read has three color components of Y (yellow), M (magenta) and C (cyan). An image input section 101 is color image pickup means having photo-receiving devices such as CCDs and using color filters. The read image data of the three color components are given in order of the scan direction per pixel. That is, the image input section 101 obtains image data corresponding to the image having the above-mentioned structure in FIG. 2 by scanning the surface of an object to be read by using the photo-receiving devices and via the color filters. A portion of one pixel within the image data is composed of the three color components. The image data is given to a pixel range discriminating section 102 in the order of the scan direction per pixel. The image data of one pixel corresponds to the YMC data of one pixel in the first embodiment.

The pixel range discriminating section 102 comprises a differential value calculating section 103, a maximum differential value selecting section 104 and a pixel discriminating section 105. The differential value calculating section 103 calculates mutual differential values Y–M, M–C and C–Y of the three color components Y, M and C composing the image data of one pixel and obtains their absolute values. The maximum differential value selecting section 104 selects a combination whose value is maximum among the three combinations {|Y–M|, |M–C|, |C–Y|} of the absolute values of the mutual differential values as {|Y–M|, |M–C|, |C–Y|}max. That is, the maximum differential value selecting section 104 selects the maximum value {|Y–M|, |M–C|, |C–Y|}max among the absolute values of the three mutual differential values |Y–M|, |M–C| and |C–Y|. The maximum value corresponds to the maximum differential value R in the first embodiment and both values are equal. It is noted that there is a case when the maximum value is described as "Y–M–Cmax" hereinafter.

The pixel discriminating section 105 compares the maximum value {|Y–M|, |M–C|, |C–Y|}max with predetermined threshold values Qα and Qβ (Qα<Qβ, Qα>0, Qβ>0) set in advance and discriminates the pixel corresponding to the image data of one pixel as a pixel belonging to the black-and-white range when {|Y–M|, |M–C|, |C–Y|}max<Qα or discriminates it as a pixel belonging to the color range when ({|Y–M|, |M–C|, |C–Y|}max>Qβ. It discriminates it as a pixel belonging to the medium range where it cannot be said to be belonging either to the black-and-white range or to the color range when Qα≦{|Y–M|, |M–C|, |C–Y|}max≦Qβ. The above-mentioned two threshold values Qα and Qβ correspond to the threshold value β and γ in the first embodiment, respectively. That is, the threshold value Qα equals to the threshold value β, and the threshold value Qβ equals to the threshold value γ.

That is, the pixel discriminating section 105 discriminates pixels belonging to the color range among all pixels within the image as color range pixels 106, pixels belonging to the medium range as medium range pixels 107 and pixels belonging to the monochrome range as monochrome range pixels 108. A pixel counting section 110 counts a number of occurrence of the pixels by a color pixel counter 111, a medium pixel counter 112 or a monochrome pixel counter 113 every time when the color range pixel 106, the medium range pixel 107 or the monochrome range pixel 108 appears.

A monochrome block recognizing section 109 recognizes a part in which the monochrome range pixels 108 are continuously occurring as a monochrome block. The pixels belonging to the monochrome block recognized by the monochrome block recognizing section 109 are counted by a monochrome block counter 114. The monochrome block recognizing section 109 recognizes the range to which the pixels at the monochrome block starting and ending portions belong. A color noise removing section 115 makes a correction for removing color noise on the pixels at the monochrome block starting and ending portions recognized by the monochrome block recognizing section 109. This correction will be described later.

Based on the counter values of the color pixel counter 111, the medium pixel counter 112 and the monochrome pixel counter 113, a color image discriminating section 116 judges whether or not the image indicated by the inputted image data is a color image and a final output section 117 outputs a color image or a monochrome image in accordance to the result of the discrimination. The pixel range discriminating section 102, the monochrome block recognizing section 109, the pixel counting section 110, the color noise removing section 115 and the color image discriminating section 116 are realized by programmed operations of a computer.

FIG. 7 shows a principle how to categorize a pixel into the color range, the medium range or the black-and-white range by the combinations of the mutual differential values of the color components. This principle is based on the fact that the pixel may be presumed to be achromatic when $Y \equiv M \equiv C$ from the theory of additive mixture of colors. Actually, the pixel discrimination is carried out by weighting each color component by using positive constants k1, k2 and k3 as $Y'=k1Y$, $M'=k2M$, $C'=k3C$ in order to adjust the color balance and by using the weighted color components Y', M' and C'. Here, the case when they are not weighted will be explained for convenience in explaining.

When the threshold values $Q\alpha$ and $Q\beta$ for the pixel discrimination are set at $Q\alpha=20$ and $Q\beta=30$ and $Y=30$, $M=10$, and $C=45$ are given as inputted image data of one pixel for example, the maximum value $\{|Y-M|, |M-C|, |C-Y|\}$max among the absolute values of the three mutual differential values turns out as follows:

$$\{|30-10|, |10-45|, |45-30|\}\text{max} \rightarrow 35$$

Then, the pixel corresponding to the image data of one pixel may be judged as a pixel belonging to the color range by comparing with the threshold values $Q\alpha$ and $Q\beta$.

Similarly to that, when the threshold values $Q\alpha$ and $Q\beta$ for the pixel discrimination are set at $Q\alpha=20$ and $Q\beta=30$ and $Y=30$, $M=40$ and $C=15$ are given as inputted image data of one pixel, the maximum value turns out as follows:

$$\{|30-40|, |40-15|, |15-30|\}\text{max} \rightarrow 25$$

Then, the pixel corresponding to the image data of one pixel may be judged as a pixel belonging to the medium range by comparing with the threshold values $Q\alpha$ and $Q\beta$.

When the pixel corresponding to the image data of one pixel belongs to the black-and-white range, the pixel is determined further whether it belongs to the monochrome range or the ground range through the following procedure. That is, a minimum value $\{Y, M, C\}$min among the three color components Y, M and C within the image data of one pixel is compared with a predefined an image ground threshold value $Q\omega$. When $\{Y, M, C\}$min$\geq Q\omega$, the pixel is judged as a pixel belonging to a black range, i.e., the monochrome range, and when $\{Y, M, C\}$min<$Q\omega$, the pixel is judged as a pixel belonging to a white range, i.e., the ground range.

In concrete, terms the pixel counting section 110 shown in FIG. 6 increments counts of the color pixel counter 111, the medium pixel counter 112 or the monochrome pixel counter 113 by the number of occurrences every time when a pixel judged as the color range pixel 106, the medium range pixel 107 or the monochrome range pixel 108 by the pixel discriminating section 105 occurs, respectively. Thereby, the number of occurrences of the color pixels, medium pixels and monochrome pixels in the image, except of the pixels assumed to be belonging to the ground range, may be calculated.

Figure 8A:
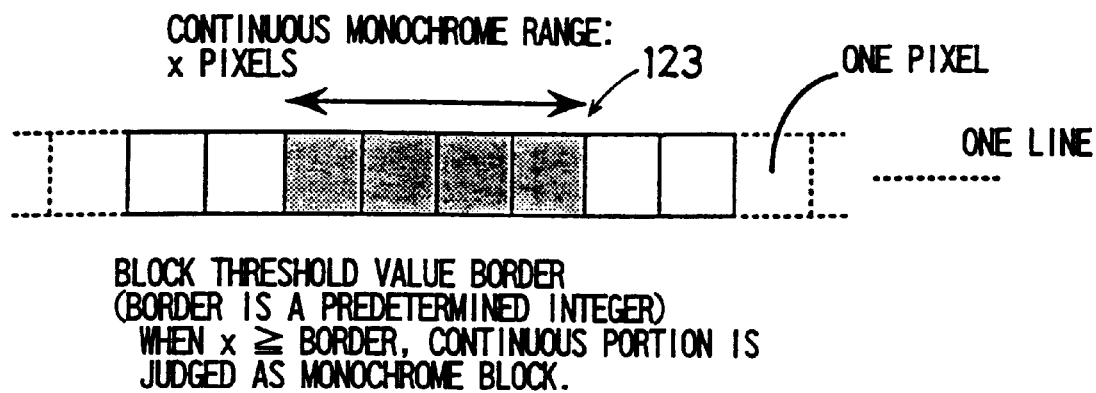
FIGS. 8A and 8B are diagrams showing a concept in removing color noise in the second embodiment.
Figure 8B:
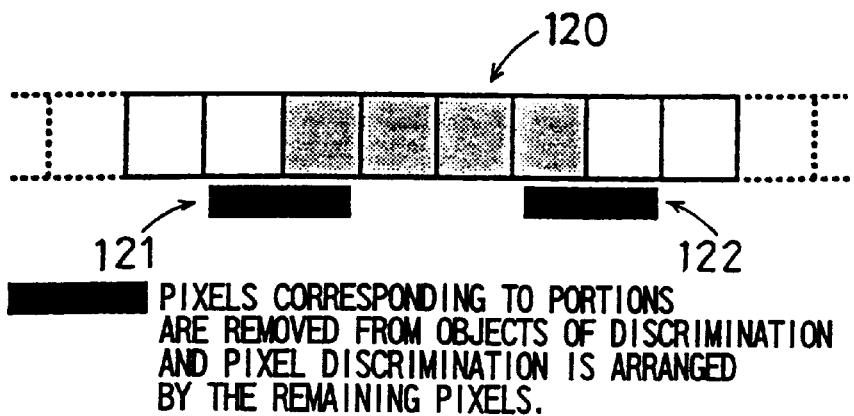

FIGS. 8A and 8B show conceptually, implemented by the color noise removing section 115, how to remove the influence of color noise which is liable to occur at the monochrome edge portion. The color noise is removed as follows. When a monochrome block 120 in which pixels continues more than a predetermined length in order of pixels is detected, there is a possibility that color noise is occurring on pixels at both end portions 121 and 122 which correspond to boundaries between the monochrome block 120 and a color pixel, an medium pixel or an image ground pixel, so that the pixels at the both end portions thereof are removed from the objects of the pixel discrimination. FIGS. 8A and 8B show a portion of one arbitrary line of an image, respectively, and each rectangle within the line corresponds to a pixel.

As shown in FIG. 8A, a threshold value BORDER of a block is set at a predetermined positive integer and when a number of pixels x belonging to a continuous monochrome range 123x $\geq$BORDER, the continuous part is judged as being the monochrome block 120. The continuous monochrome range 123 is the part where a plurality of monochrome range pixels 108 are arrayed continuously within one line. Because there is a great possibility that the ranges of the pixels belonging to the border portions 121 and 122 of such continuous monochrome range 123 are erroneously discriminated, the color noise removing section 115 removes them from the objects of the range discrimination and judges whether or not the image is a color image based only on the remaining pixels as shown in FIG. 8B.

Figure 9:
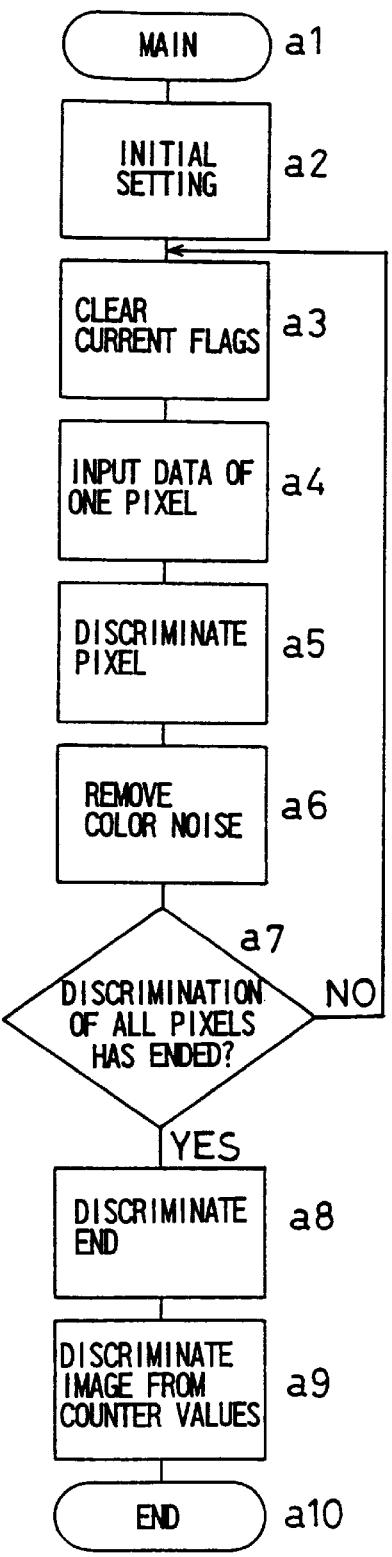
FIG. 9 is a flowchart showing a main process in the image discriminating apparatus in FIG. 6.

FIG. 9 shows an overall processing procedure of the image discriminating apparatus 100 shown in FIG. 6. Here, the width of the objective pixel to be removed in both the end portions 121 and 122 of the monochrome block 120 will be set at 1 and two pixels in total on the both sides will be removed in order to simplify the explanation.

The main procedure starts from Step a1 and initial setting of counter values of the counters and the like is implemented in Step a2. Current flags are cleared in Step a3 and image data of one pixel is inputted in Step a4. Then, a range to which a pixel indicated by the inputted image data belongs is discriminated in Step a5. The color noise removing process is carried out in Step a6. It is then determined whether or not the range discrimination of the all pixels within the image has ended in Step a7. When it has not ended yet, the process returns to Step a3. When it is determined in Step a7 that the discrimination of the all pixels has ended, an end discriminating process is carried out in Step a8. Then, the image is discriminated based on values of the counters in Step a9 and the main procedure ends in Step a10.

Figure 10:
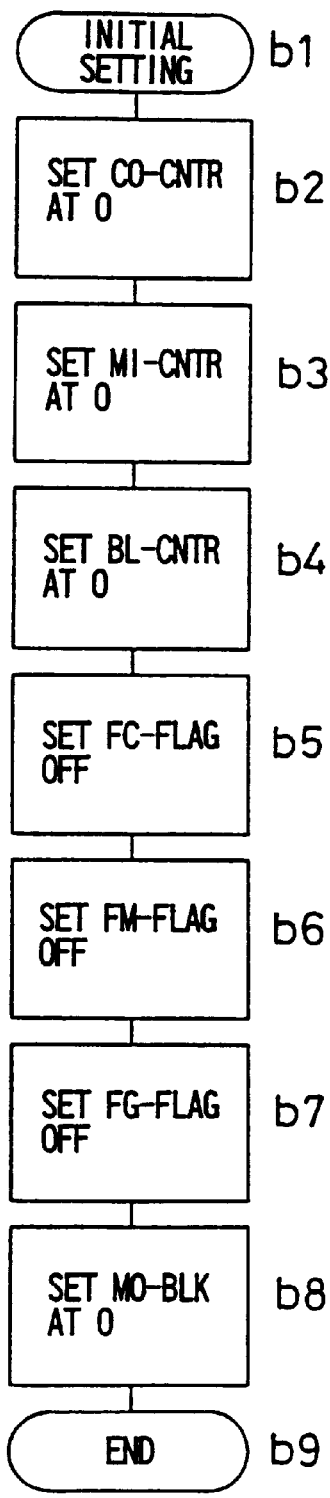
FIG. 10 is a flowchart showing an initial setting process in Step a2 in FIG. 9.

FIG. 10 shows a procedure when the initial setting in Step a2 in FIG. 9 is carried out as a sub-routine. The initial setting process starts from Step b1 and a counter value CO-CNTR of the color pixel counter 111 is set at 0 in Step b2. Then, a counter value MI-CNTR of the medium pixel counter 112 is set at 0 in Step b3 and a counter value BL-CNTR of the monochrome pixel counter 113 is set at 0 in Step b4. A front color flag FC-FLAG which is normally OFF is set OFF as a flag for a color pixel at position facing to the current position of the object to be discriminated interposing the monochrome block 120 therebetween in Step b5. The current position of the object to be discriminated is position of the pixel which is the current object of the range discriminating process within the image and the pixel at the current moment of time refers to the pixel of which the image data has been given to the pixel range discriminating section 102 at the current moment of time.

A front medium flag FM-FLAG which is normally OFF is set OFF as a flag for an medium pixel at position facing to the current position of the object to be discriminated interposing the monochrome block 120 therebetween in Step b6. A front ground flag FG-FLAG which is normally OFF is set OFF as a flag for a ground pixel at position facing to the current position of the object to be discriminated interposing the monochrome block 120 therebetween in Step b7. When pixels which are judged as belonging to the monochrome range occur continuously in the reading order, a counter value MO-PLK of the monochrome block counter 114 which indicates the number of continuation is set at 0 in Step b8. The procedure ends in Step b9.

Figure 11:
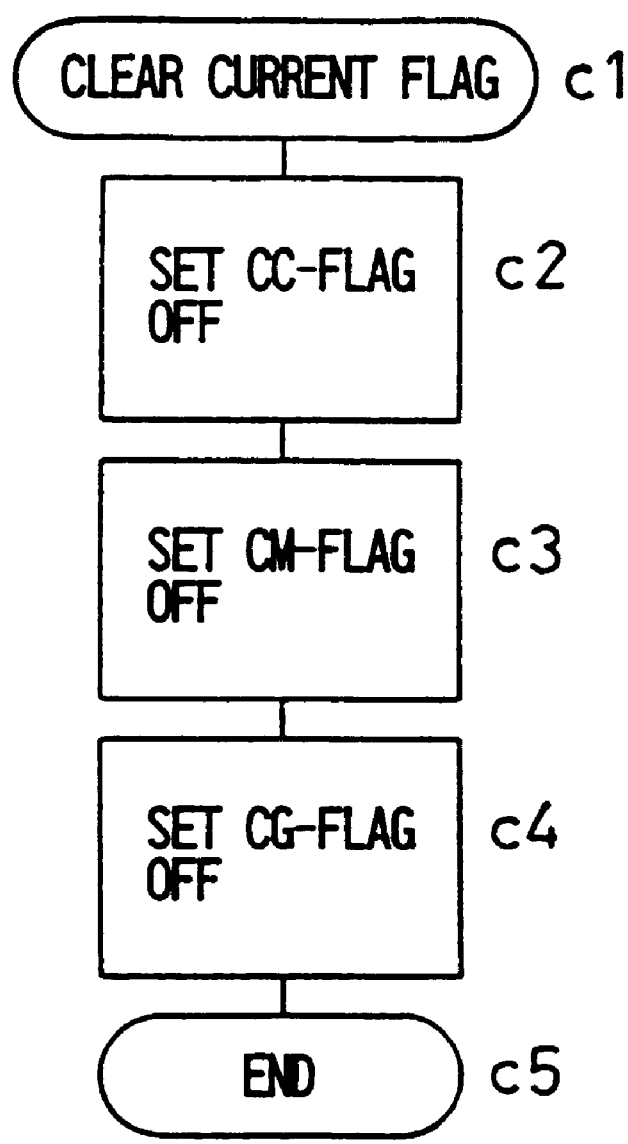
FIG. 11 is a flowchart showing a current flag clear process in Step a3 in FIG. 9.

FIG. 11 shows a procedure in implementing the current flag clearing process in Step a3 in FIG. 9 as a sub-routine. The current flag clearing process starts from Step c1. A current color flag CC-FLAG which is used as a flag for a color pixel at the current position of the object to be discriminated and which is normally OFF and which turns ON when the current objective pixel to be discriminated is judged as belonging to the color range is set at OFF in Step c2. A current medium flag CM-FLAG which is normally OFF and which turns ON when the current objective pixel to be discriminated is judged as belonging to the medium range is set at OFF as a flag for an medium pixel at the current position of the object to be discriminated in Step c3. A current ground flag CG-FLAG which is normally OFF and which turns ON when the current objective pixel to be discriminated is judged as belonging to the ground range is set at OFF as a flag for a ground pixel at the current position of the object to be discriminated in Step c4. The current flag clearing process ends in Step c5.

Figure 12:
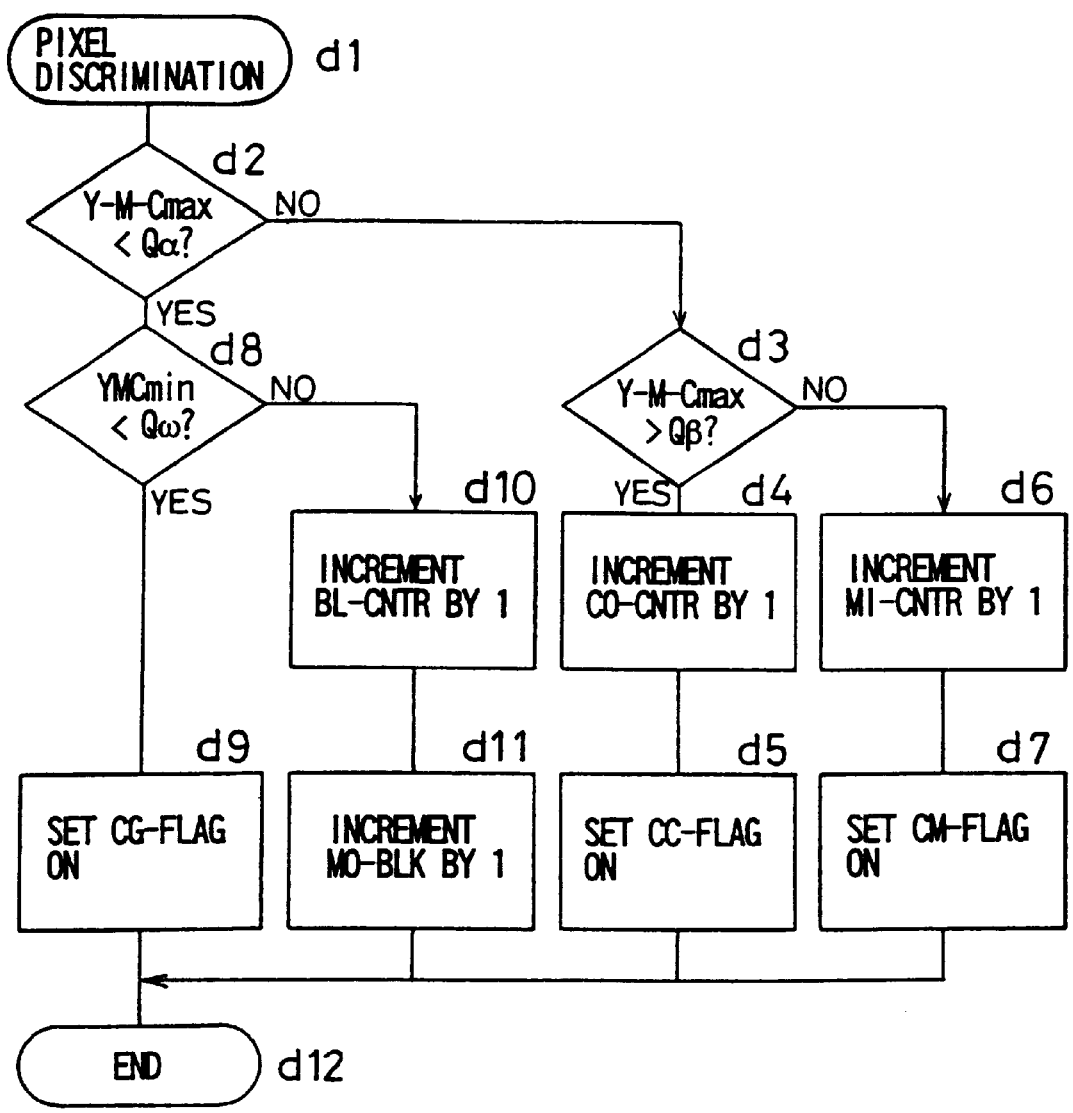
FIG. 12 is a flowchart showing a pixel discriminating process in Step a5 in FIG. 9.

FIG. 12 shows a procedure in implementing the pixel discriminating process in Step a5 in FIG. 9 as a sub-routine. The pixel discriminating process starts from Step d1. It is determined in Step d2 whether or not the maximum value Y–M–Cmax of the absolute values of the mutual differential values among the color components is smaller than the first threshold value Qα. When it is discriminated that the maximum value Y–M–Cmax is not smaller than the first threshold value Qα, it is determined in Step d3 whether or not the maximum value Y–M–Cmax of the mutual differential values is greater than the second threshold value Qβ. When it is determined to be greater than the threshold value Qβ, the counter value CO-CNTR of the color pixel is incremented by one in Step d4 and the current color flag CC-FLAG is set ON in Step d5. When it is determined in Step d3 that it is not greater than the threshold value Qβ, the counter value MI-CNTR of the medium pixel is incremented by one and the current medium flag CM-FLAG is set ON in Step d7.

When it is determined that the maximum value of the mutual differential values is smaller than the threshold value Qα in Step d2, it is determined whether or not the minimum value of each of the color components Y, M and C is smaller than the third threshold value Qω in Step d8. It is noted that the minimum value is described as "YMCmin" in FIG. 12. When it is determined to be smaller than the threshold value Qω in Step d8, the current ground flag CG-FLAG is set ON in Step d9. When it is determined not to be smaller than the threshold value Qω in Step d8, the counter value BL-CNTR of the monochrome pixel is incremented by one in Step d10 and the counter value MO-BLK of the monochrome block is incremented by one in Step d11. When the process in Step d5, d7, d9 or d11 ends, the pixel discriminating process ends in Step d12.

In the pixel discriminating process in FIG. 12, Y–M–Cmax={|Y–M|, |M–C|, |C–Y|}max that is the combination whose absolute value of the mutual differences of the color components Y, M and C of the image data of one pixel which is the input data is maximum is compared with the two pixel discriminating threshold values Qα and Qβ to judge to which of the color range, the medium range or the black-and-white range the pixel corresponding to the image data belongs. As for the pixel assumed to be belonging to the black-and-white range, it is judged whether it belongs to the ground range, i.e., the white range, or to the monochrome range, i.e., the black range, by comparing with the ground threshold value Qω. When a pixel belonging to the color range or the medium range occurs, the corresponding color pixel counter 111 or medium pixel counter 112 is incremented by one and the current color flag CC-FLAG or the current medium flag CM-FLAG is turned ON. When a pixel judged as belonging to the monochrome range occurs, the monochrome pixel counter 113 as well as the monochrome block counter 114 are incremented by one. When a pixel belonging to the ground range occurs, the current ground flag CG-FLAG is turned ON.

Figure 13:
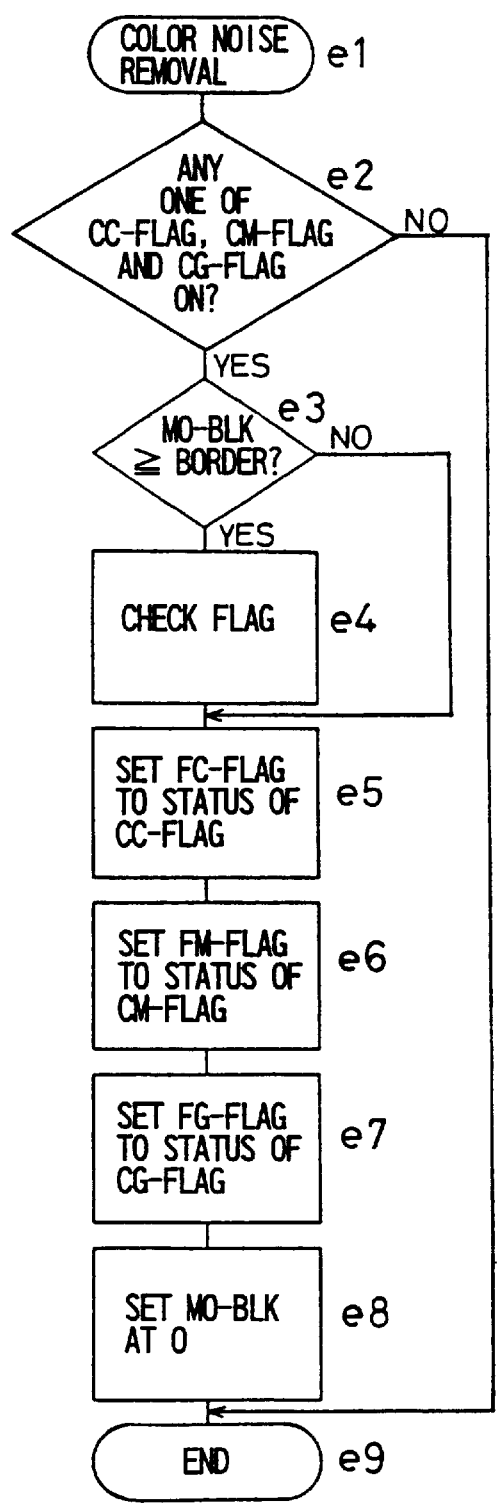
FIG. 13 is a flowchart showing a color noise removing process in Step a6 in FIG. 9.

FIG. 13 shows a procedure in implementing the color noise removing process in Step a6 in FIG. 9 as a sub-routine. The color noise removing process starts from Step e1. It is determined in Step e2 whether or not any one of the current color flag CC-FLAG, the current medium flag CM-FLAG and the current ground flag CG-FLAG is ON. When any one of them is ON, it is determined whether or not the counter value MO-BLK of the monochrome block counter 114 is greater than the preset monochrome block threshold value BORDER in Step e3. When the condition holds, a flag check is carried out in Step e4.

After the flag check in Step e4 or when the condition does not hold in Step e3, the front color flag FC-FLAG is set to the status of the current color flag CC-FLAG in Step e5. The front medium flag FM-FLAG is set to the status of the current medium flag CM-FLAG in Step e6. The front ground flag FG-FLAG is set to the status of the current ground flag CG-FLAG in Step e7. The counter value MO-BLK of the monochrome block counter 114 is set at 0 in Step e8. After ending Step e8 or when the condition in Step e2 does not hold, the color noise removing process ends in Step e9.

Thus, in the color noise removing process, ON/OFF which indicates the status of each current flag at the current position of the objective pixel to be discriminated turns out to be the status of each front flag in removing color noise at the next position of the objective pixel to be discriminated, the front flag is set to the status of the corresponding present current flag from Step e5 to Step e7 in FIG. 13 after the flag check. Further, the counter value MO-BLK of the monochrome block counter 114 is set at 0 and is cleared in Step e8.

In the color noise removing process in FIG. 13, the counter value MO-BLK of the monochrome block counter 114 is compared with the monochrome block threshold value BORDER when any one of the current color flag CC-FLAG, the current medium flag CM-FLAG or the current ground flag CG-FLAG is ON and the color noise removing process is carried out when the counter value MO-BLK of the monochrome block counter 114 is greater than the monochrome block threshold value BORDER, supposing that color noise may be occurring at the both end portions 121 and 122 of the monochrome block 120. When the counter value MO-BLK of the monochrome block counter 114 is smaller than the monochrome block threshold value BORDER, no color noise removing process is carried out. It is because the color noise removing process is applied only to the monochrome block 120 having a size greater than a predetermined size because a continuous monochrome range having a size smaller than the predetermined size may be an isolated point or mere noise. The color noise removing process is carried out by correcting the counter values of the respective counters 111 through 113 based on the status of each current flag and each front flag.

Figure 14:
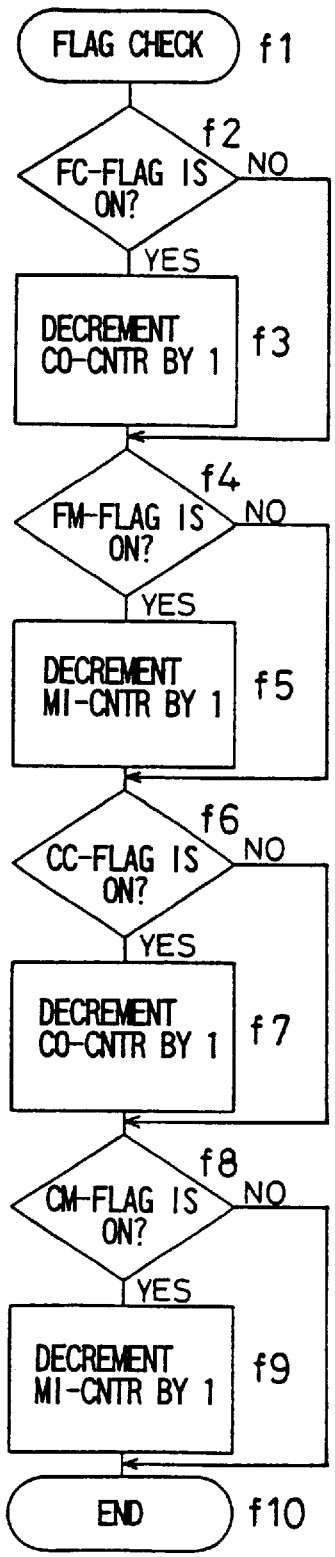
FIG. 14 is a flowchart showing a flag checking process in Step e4 in FIG. 13.

FIG. 14 shows a procedure in implementing the flag checking process in Step e4 in FIG. 13 as a sub-routine. The flag checking process starts from Step fi. It is determined whether or not the front color flag FC-FLAG is ON in Step f2. When it is ON, the counter value CO-CNTR of the color pixel counter 111 is decremented by one. After Step f3 or when the condition in Step f2 does not hold, it is determined whether or not the front medium flag FM-FLAG is ON in Step f4. When it is ON, the counter value MI-CNTR of the medium pixel counter 112 is decremented by one in Step f5.

After Step f5 or when the condition in Step f4 does not hold, it is determined whether or not the current color flag CC-FLAG is ON in Step f6. When it is determined to be ON, the counter value CO-CNTR of the color pixel counter 111 is decremented by one in Step f7. After Step f7 or when the condition does not hold in Step f6, it is determined whether or not the current medium flag CM-FLAG is ON in Step f8. When it is determined to be ON, the counter value MI-CNTR of the medium pixel counter 112 is decremented by one in Step f9. After Step f9 or when the condition does not hold in Step f8, the flag checking process ends in Step f10. It is noted that when the current ground flag CG-FLAG and the front ground flag FG-FLAG are ON, no color noise exists in the ground part of the image in principle, so that it is ignored. As a result, the values of the color and medium pixel counters 111 and 112 are incremented/decremented in accordance to the status of those four flags.

Figure 15:
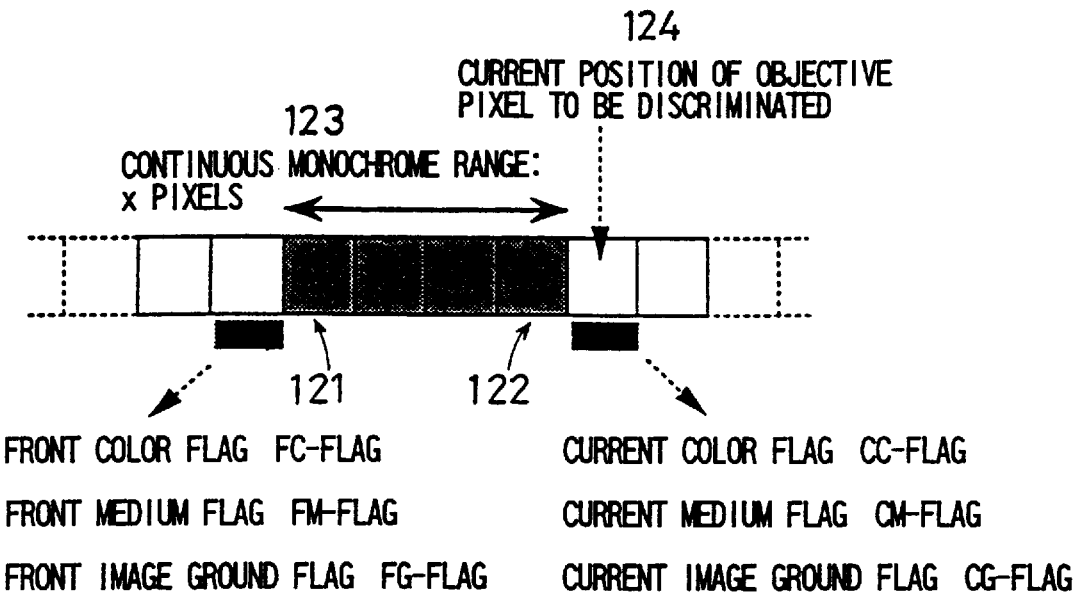
FIG. 15 is a diagram showing a state in which flags are set before and behind a continuous monochrome range in the second embodiment.

FIG. 15 shows a concept how to set the flags to the pixels at the position facing to the both end portions 121 and 122 of a continuous monochrome range 123. It is determined that the continuous monochrome range 123 has ended when the current color flag CC-FLAG, the current medium flag CM-FLAG or the current ground flag CG-FLAG is set at the current position of the objective pixel 124 to be discriminated. The front color flag FC-FLAG, the front medium flag FM-FLAG or the front ground flag FG-FLAG is set on the pixel at the starting portion 121 of the continuous monochrome range 123 based on the current flags CC-FLAG, CM-FLAG and CG-FLAG.

Figure 16:
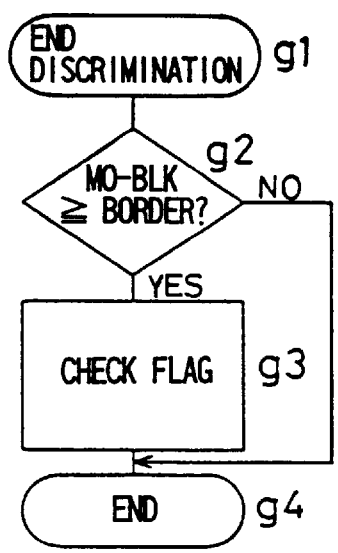
FIG. 16 is a flowchart showing an end discriminating process in Step a8 in FIG. 9.

FIG. 16 shows a procedure in implementing the end discriminating process in Step a8 in FIG. 9 as a sub-routine. The end discriminating process is a process of implementing the color noise removing process on pixels left still as a monochrome block at the starting point of time of the end discriminating process. The end discriminating process starts from Step g1. It is determined whether or not the counter value MO-BLK of the monochrome block counter 114 is greater than the monochrome block threshold value BORDER in Step g2. When the condition holds, the flag checking process as shown in FIG. 14 is carried out in Step g3. When the process in Step g3 ends or the condition does not hold in Step g2, the end discriminating process ends in Step g4.

Figure 17:
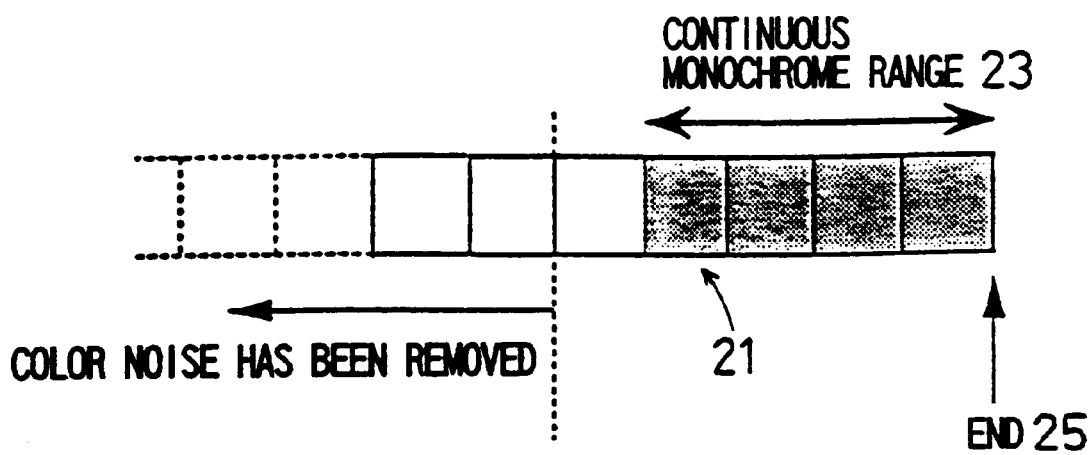
FIG. 17 is a diagram showing a concept of an ending process in the second embodiment.

FIG. 17 shows a concept of the ending process. When the pixel discriminating process based on the image data ends after determining that several continuous pixels within the image belong to the monochrome range and then determining that a pixel at the end 25 of the image also belongs to the monochrome range, no judgement whether or not the color noise removing process should be carried out has been executed yet to the pixels within the continuous monochrome range 23 containing the pixel at the end 25. The judgement on the continuous monochrome range 23 is carried out as the end discriminating process in FIG. 16.

In the ending process, the counter value MO-BLK of the monochrome block-counter 114 at the point of time when all of the pixel discriminating process has ended is compared with the monochrome block threshold value BORDER to judge whether or not the color noise removing process should be carried out. When the color noise removing process Is to be carried out, it is carried out based on the status of the respective front flags. The status of the respective current flags may be ignored because the end is dealt in this case.

The image discrimination is carried out based on the counter values of the color pixel counter 111, the medium pixel counter 112 and the monochrome pixel counter 113 obtained in the end as a result of the discrimination described above. As an image discriminating method, there is a method of comparing the counter value of the color pixel counter 111 with a predetermined threshold value, judging the image as a color image when the counter value of the color pixel counter 111 exceeds the threshold value, and when the above-mentioned condition does not hold, comparing the counter value of the monochrome pixel counter 113 with a predetermined threshold value to judge the image as a monochrome image when the counter value of the monochrome pixel counter 113 exceeds the threshold value.

When neither of the conditions are met in the above-mentioned method, the above-mentioned discrimination result is corrected taking the counter value of the medium pixel counter 112 into account. For instance, when a total value of the counter value of the color pixel counter 111 and the weighted counter value of the medium pixel counter 112 is compared with a predetermined threshold value and when the total value exceeds the threshold value, the image is judged as a color image. The weighted counter value of the medium pixel counter 112 is a half or ⅓ of the counter value of the medium pixel counter 112 for example. When all of the above-mentioned three conditions are not met, the image is judged as a monochrome image.

Although the present embodiment has been explained by using the three color components of Y, M and C as the color components composing the inputted image data of one pixel, the same applies also when components such as R (red), G (green) and B (blue) are used. Further, although the width of the objective pixel from which color noise is to be removed at each end of the monochrome block has been one pixel, i.e., two pixels at the both ends of the monochrome block, in the embodiment, the invention is not confined only to that and the width of the object from which color noise is to be removed may be widened to two pixels, i.e., four pixels at the both ends in practice, in an image in which color noise is assumed to be occurring in a wide range.

According to the image discrimination of the present embodiment, color noise occurring in the vicinity of a monochrome edge and the influence on the pixels in the range which is hard to discriminate just by the value of density, which have been questioned in the image discrimination, may be reduced and images may be discriminated with less erroneous discrimination. In the same time, because the image may be discriminated by incrementing/decrementing the pixel counters instead of using buffers for storing image data in removing color noise, the processing circuits may be compacted. Still more, because it requires no time to access to image data many times, the process may be quickened.

The image discriminating apparatus 100 of the second embodiment may be arranged so as to discriminate the type of an image to be processed based on a number of color lines of the whole image similarly to the image discriminating apparatus of the first embodiment after ending the pixel discriminating process. That is, after ending the discriminating process of each pixel, the apparatus 100 may be arranged so as to count a number of pixels of color pixels, medium pixels and monochrome pixels in each line within the image by the counters 111 through 113, respectively, to correct the number of pixels by the color noise removing section 115, to judge whether each line is a color line or a monochrome line based on the number of pixels and to discriminate the type of the image based on the number of color lines of the whole image. As a result, the accuracy of the discrimination of the type of the image may be improved further.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An image discriminating apparatus comprising:

image inputting means for inputting image data corresponding to an image composed of a plurality of pixels, which image data contains a plurality of color components on each pixel;

a pixel categorizing section for categorizing each pixel as a color pixel, a medium pixel, or a monochrome pixel, wherein the pixel is categorized as medium when the pixel categorizing section cannot determine whether the pixel is color or monochrome;

a line categorizing section for categorizing each line as a color line or a monochrome line based on numbers of the color pixels, medium pixels, and monochrome pixels in each line; and an image categorizing section for categorizing the image as a color image or a monochrome image based on a number of color lines in the image.

2. The image discriminating apparatus of claim 1, wherein, when a value obtained by adding a value obtained by multiplying the number of the medium pixels in one line with a predefined value of weight to the number of color pixels exceeds a predefined threshold value, the line categorizing section judges the line as being a color line.

3. The image discriminating apparatus of claim 1, wherein, when the line categorizing section detects a monochrome block which is composed of a plurality of continuous monochrome pixels within one line, the line categorizing section subtracts a number of pixels adjacent to the both sides of the monochrome block from at least either the number of the color pixels or the number of the medium pixels.

4. The image discriminating apparatus of claim 1, wherein the pixel categorizing section comprises:

a differential computing circuit for calculating absolute values of the differences between the color components on one pixel; and a first comparator circuit, responsive to results computed by the differential computing circuit, for comparing the results computed by the differential computing circuit with each other and with predefined threshold values.

5. The image discriminating apparatus of claim 4, wherein the line categorizing section comprises:

a pixel counter, responsive to an output from the pixel categorizing section, for counting numbers of color pixels, monochrome pixels, and medium pixels, respectively; and a second comparator circuit, responsive to an output from the pixel counter, for comparing the output of the pixel counter with a predefined threshold value.

6. The image discriminating apparatus of claim 5, wherein the image categorizing section comprises:

a line counter, responsive to an output from the line categorizing section, for counting numbers of lines; and a third comparator circuit, responsive to an output from the line counter, for comparing the output of the line counter with a predefined threshold value.

7. An image discriminating apparatus comprising:

image inputting means for inputting image data corresponding to an image composed of a plurality of pixels, which image data contains a plurality of color components of each pixel;

pixel range discriminating means for judging to which of a color range, a medium range, or a black-and-white range each pixel belongs based on the image data obtained from the image inputting means, wherein the pixel is judged as medium when the pixel range discriminating means cannot determine whether the pixel is color or black-and-white;

black-and-white range discriminating means for categorizing a pixel judged to belong to the black-and-white range by the pixel range discriminating means, into a monochrome range or a ground range;

pixel counting means for counting numbers of color pixels, medium pixels, and monochrome pixels appearing, the pixel counting means incrementing a color pixel counter, a medium pixel counter, or a monochrome pixel counter each time a pixel appears which is judged as belonging to the color range, the medium range, or the monochrome range by the pixel range discriminating means and the black-and-white range discriminating means;

monochrome block recognizing means for when there exists a portion where more than a predetermined number of pixels which are judged as belonging to the monochrome range by the black-and-white discriminating means occur continuously, recognizing the portion as a monochrome block;

counter value correcting means for determining when pixels positioned at both ends of the monochrome block as recognized by the monochrome block recognizing means belong to the color range or the medium range, decrementing the color pixel counter or the medium pixel counter by numbers of pixels of the color range and of the medium range at both ends of the monochrome block, and when the pixels positioned at both ends of the monochrome block belong to the ground range, not incrementing nor decrementing any of the color pixel counter, the medium pixel counter and the monochrome pixel counter; and image categorizing means for categorizing the image into a color image or a monochrome image based on the counter values of the color pixel counter, medium pixel counter, and monochrome pixel counter.

8. The image discriminating apparatus of claim 7, wherein in judging to which of the color range, the medium range or the black-and-white range each pixel belongs, the pixel range discriminating means selects a maximum from absolute values of mutual differential values of combinations of the color components of a portion within the image data, corresponding to each pixel, and adopts the maximum absolute value as a criterion to discriminate the pixel.

9. The image discriminating apparatus of claim 7, wherein the black-and-white range discriminating means compares a minimum of color component values of a portion within the image data, corresponding to each pixel judged as belonging to the black-and-white range, with the predetermined threshold value in connection with the categorization into the monochrome range and the ground range, and on the basis of a result of the comparison, categorizes each pixel into the monochrome range or the ground range.

* * * * *